Oct. 25, 1966   D. E. DAVIDSON   3,281,605
PHASE RESPONSIVE OPTICAL INDEXING INSTRUMENT
Filed Nov. 15, 1961
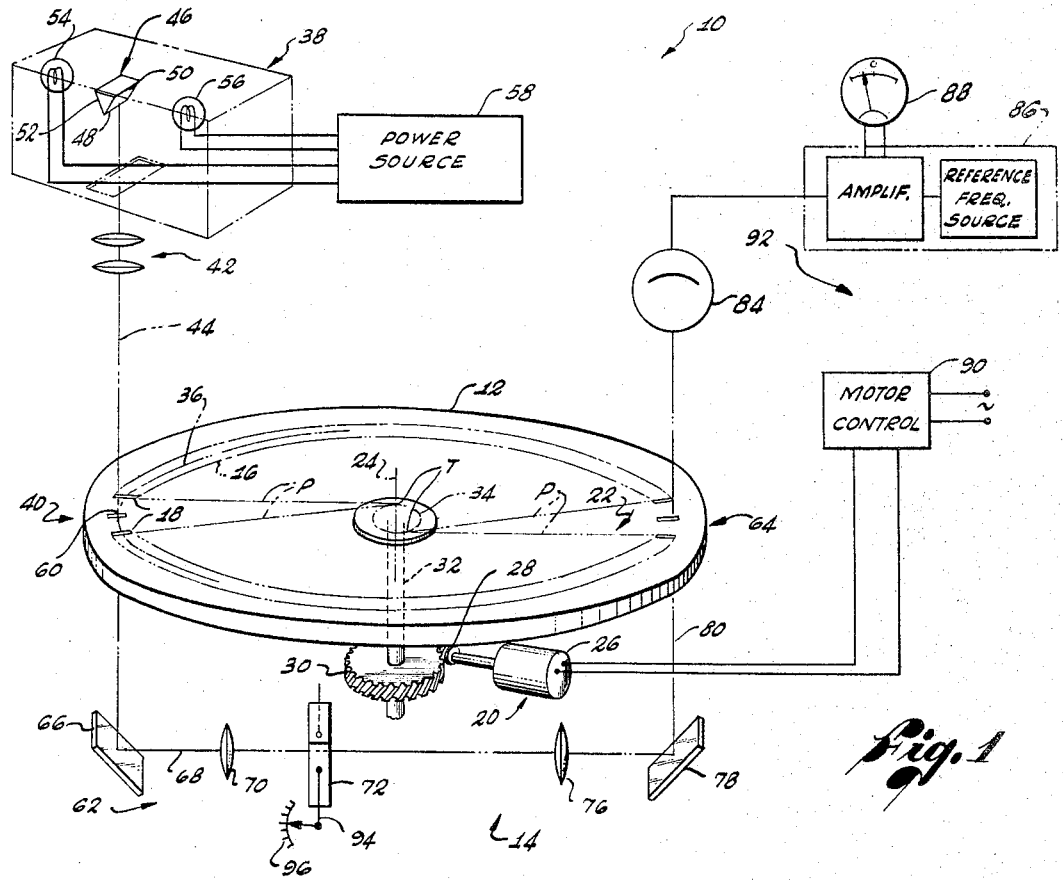
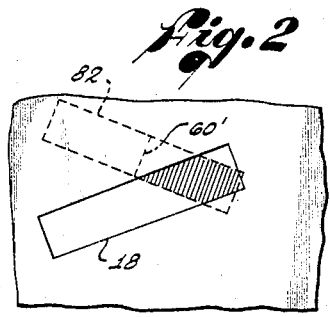
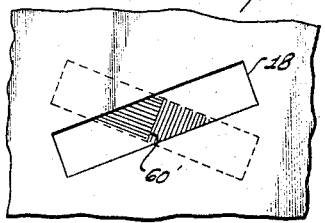
INVENTOR.
DONALD E. DAVIDSON
BY Lilly & Nyhagen
ATTORNEYS United States Patent Office 3,281,605
Patented Oct. 25, 1966

3,281,605
PHASE RESPONSIVE OPTICAL INDEXING
INSTRUMENT
Donald E. Davidson, La Habra, Calif., assignor to Davidson Optronics, Inc., West Covina, Calif., a corporation of California
Filed Nov. 15, 1961, Ser. No. 152,420
6 Claims. (Cl. 250—233)

This invention relates generally to optical instruments and, particularly, to an optical indexing instrument.

My Patent No. 3,054,901 issued September 18, 1962, for Indexing Instrument discloses an optical indexing instrument provided with an opaque shutter having a row of transparent indexing slits and an optical projection means. These parts are movable with respect to one another in such a manner that the relative movement of the shutter with respect to the projection means is along a direction line parallel to the row of slits. In use of the instrument, one of the parts is stationary and the other part is driven with respect to the first part by means of a motor. This driven part is, then, the indexable part.

The optical projection means includes an illumination source located at one side of the shutter opposite a first position along the path of relative movement of the shutter slits with respect to the projection means. During movement of the driven part, each shutter slit is illuminated by this source as it undergoes relative movement through the first position. Further included in the optical projection means is an optical system for producing an optical image of each illuminated slit at a second position along the slit row in such a manner that each slit image and an indexing slit undergo relative movement across one another at the second position.

During relative movement of each slit image and slit across one another at the second position, the amount of light transmitted through the respective slit increases to a maximum as the slit image approaches a centered position on the respective slit and then diminishes as the slit image moves away from its centered position. Thus, when each slit image is exactly centered on an indexing slit, maximum light is transmitted through the slit. The positions of the driven part where this maximum light condition occurs are its index positions. Located to receive light transmitted through each slit from a slit image is a photocell, the output of which is connected through an amplifier to a meter for indicating alignment of the driven part with each index position.

The present invention provides an optical indexing instrument of this same general character. In the present instrument, however, each slit is illuminated at one end by fluctuating light of one phase, at the other end by fluctuating light of another phase, and receives a light separation image which forms a fine line of demarcation between the light of one phase and the light of the other phase. The projection means of the instrument produces an image of each illuminated slit which is inclined with respect to the indexing slit on which the image falls so that relative movement of the slit image and slit across one another occurs through a position in which equal amounts of light of the one phase and the other phase pass through the split. While the slit and slit image are approaching this position, the light passing through the slit is predominantly of one phase and while the slit and slit image are receding from this position, the light passing through the slit is predominantly of the other phase. The light passing through each slit from a slit image is received by a photocell, the output of which is coupled to a phase-responsive amplifier. This amplifier actuates a meter which indicates a negative reading when the light on the photocell is predominantly of one phase, a positive reading when the light on the photocell is predominantly of the other phase, and a zero reading when the photocell receives equal amounts of light of the one phase and the other phase.

In use of the instrument, the controls for the indexing motor and the meter are placed at a control station which may be located any desired distance from the main body of the instrument. When the motor is energized to drive the driven part through its successive index positions, movement of the driven part through each index position is indicated by a zero reading on the meter. Thus, the driven part of the instrument may be accurately located in any selected index position by energizing the indexing motor to initially drive the part to the vicinity of the selected index position and then position the driven part to obtain a zero meter reading.

In both the instrument of my aforementioned patent and the present instrument, each slit image and indexing slit undergo relative movement across one another at twice the speed of the relative movement between the shutter and projection means. Thus, any relative movement of the shutter with respect to any one of its index positions produces twice the relative movement of the crossing slit image and slit. This optical magnification obviously greatly improves the accuracy and sensitivity of the instruments. The accuracy and sensitivity of the prior instrument, however, is partially nullified by the fact that it responds to changes in the intensity of light incident on a photocell, and the minimum light intensity change and, hence, the minimum shutter movement which can be detected are limited. The present instrument, on the other hand, responds to a change in the phase of fluctuating light incident on a photocell, which change is abrupt in nature and permits detection of minute relative displacements of the slit image and slit from their centered position. This phase response coupled with the optical magnification noted above produces a highly sensitive and accurate indexing instrument.

An additional feature of the invention resides in the placement of an optical tipping plate in the path of the light rays from the illuminated slit to the slit image for shifting the latter along the row of slits and thereby permitting interpolation of the position of the driven part between two adjacent index positions.

With this preliminary discussion in mind, a general object of the invention may be stated as being to provide a new and improved optical indexing instrument.

A more specific object of the invention is to provide an optical indexing instrument in which movement of the driven part of the instrument through each of its index positions effects a change in the phase of light incident on a photocell or the like, whereby accurate positioning of the driven part in any selected index position may be accomplished from a remote control station having means for controlling the movement of the driven part and for indicating the phase of light incident on the photocell.

Another object of the invention is to provide an optical indexing instrument of the character described wherein the position of the driven part between two adjacent index positions may be interpolated.

Other objects, advantages, and features of the invention will become readily apparent as the description proceeds.

A presently preferred embodiment of the invention will now be described by reference to the attached drawing, wherein:

FIG. 1 diagrammatically illustrates the preferred embodiment of the invention;

FIG. 2 illustrates the slit image which is produced in the instrument and an indexing slit in one position during relative movement of the image and slit across one another; and FIG. 3 is a view similar to FIG. 2 showing the slit image and slit in another relative position.

The indexing instrument 10 illustrated in this drawing comprises an opaque shutter 12 and a light transmitting and receiving system in the form of an optical projection means 14. Shutter 12 is provided with a row 16 of transparent indexing slits 18. According to one method of manufacture, shutter 12 comprises a glass plate bearing an opaque film in which the slits 18 are cut by a ruling machine. Generally denoted at 20 is a means for effecting relative movement between the shutter 12 and optical projection means 14 in such a manner that the relative movement of the shutter 12 with respect to the projection means 14 is along a direction line 22 parallel to the row 16. In the illustrated instrument, the shutter 12 comprises a circular disc which is rotatable on a central axis 24, normal to the plane of the disc, with respect to the optical projection means 14. The slit row 16 is circular and centered on this axis. Accordingly, the direction line 22 of the relative movement of the shutter 12 and the path of relative movement of the indexing slits with respect to the projection means 14 are circular about axis 24. The drive means 20 comprises a motor 26, rigid on the shaft of which is a worm 28 meshing with a worm wheel 30 on the shaft 32 of the shutter 12. Motor 26, therefore, drives the shutter 12 in rotation on its central axis 24.

The indexing slits 18 on the shutter 12 are uniformly spaced along the row 16 and are disposed in planes P parallel to the axis 24 and tangent to a circle 34 centered on the axis 24 at points of tangency T which are uniformly spaced about the axis 24. Thus, each slit is inclined slightly from the normal with respect to the longitudinal center line 36 of the row 16.

The optical projection means 14 comprises means 38 for illuminating each indexing slit 18 as it undergoes relative movement, i.e., rotation, through a first position 40 along the circular path of the relative rotational movement of the slits with respect to the projection means 14. This illumination means comprises a lens system 42, the optic axis 44 of which is perpendicular to the shutter disc 12 and intersects the longitudinal center line 36 of the row 16. On the axis 44, behind the lens system 42, is an optical prism 46, one apex edge 48 of which is located along and in a transverse plane of the axis 44. Opposite the faces 50 and 52 of the prism 46, at the two sides of the edge 48, are lamps 54 and 56, respectively. These lamps are energized alternately from a power supply 58. Lamps 54 and 56, therefore, emit phase-fluctuating light.

Prism faces 50 and 52 are inclined to the optic axis 44 so as to reflect light rays from the lamps along the axis 44 and through the lens system 42. This lens system is designed to produce an optical image 60 of the prism edge 48 on the adjacent, or upper, surface of the shutter disc 12. Prism 46 is angularly positioned on the axis 44 in such a way that the image 60 is approximately tangent to the center line 36 at position 40. The image 60, therefore, approximately parallels the direction of rotational movement of the indexing slits 18 through the position 40. Fluctuating light of one phase from one lamp 54 arrives at the shutter plane at one side of the image 60 and fluctuating light of another phase from lamp 56 arrives at the shutter plane at the opposite side of the image 60. Thus, as each indexing slit 18 rotates through position 40, it receives and is approximately bisected by the image 60 and has one end illuminated by light of said one phase from lamp 54 and its other end illuminated by light of said other phase from lamp 56. The image 60 forms a fine line of demarcation on the slit between the light of the one phase and the light of the other phase and, for that reason, it is hereinafter referred to as a light separation image.

At the side of the shutter 12, opposite the illumination means 38, the optical projection means 14 includes an optical system 62 for producing an image of each indexing slit 18, as it rotates through position 40 and is thereby illuminated, on the opposite or undersurface of the shutter 12 at a second position 64 along the path of rotational movement of the indexing slits 18. This optical system includes a reflector 66 on the optic axis 44. Reflector 66 is inclined to the axis 44 to reflect light rays it receives through the illuminated indexing slit at position 40, along an axis 68 and through a lens 70 and an optical tipping plate 72. Along the axis 68 is a second objective lens 76 and a second reflector 78 that reflects the light rays back toward the shutter 12 along an axis 80. Objective lens 76 produces an optical image of the illuminated slit on the undersurface of the shutter 12. This slit image is illustrated in FIGS. 2 and 3 and is designated by the numeral 82.

Optic axis 80 intersects the row 16 of indexing slits 18 along its longitudinal center line 36 as position 64 along the path of rotation of the slits. Slit image 82, therefore, falls on the row 16 of indexing slits 18. Position 64 is spaced along the center line 36 of the slit row 16 a distance which is a multiple of the distance between centers of adjacent indexing slits 18 along the center line 36. In the illustrated instrument, the indexing slits are arranged in pairs of diametrically opposed slits and the position 64 is diametrically across the shutter disc 12 from the position 40. It is evident, therefore, that rotational movement of each indexing slit 18 through the position 40 and across the axis 44 occurs in unison with rotational movement of another slit, namely, the diametrically opposite slit, through the position 64 and across the axis 80. It is further evident that the slit image 82 undergoes rotational movement through the position 64 and across the axis 80 in unison with but in a direction opposite to the direction of rotational movement of the latter slit through the position 64. Accordingly, during rotational movement of each indexing slit through the position 40, the image 82 of that slit and the indexing slit 18 diametrically opposite that slit undergo relative movement across one another at the position 64.

Recalling that the indexing slits 18 are disposed in the planes P of tangency to the circle 34 and are, therefore, inclined slightly to the longitudinal center line of slit row 16, it will be apparent that each indexing slit 18 and slit image 82 which undergo relative movement across one another at the position 64 are inclined with respect to one another and in opposite directions with respect to a plane containing the rotation axis 24 and passing midway between the crossing image and slit, as illustrated in FIGS. 2 and 3. Recalling further that during rotational movement of each indexing slit through the position 40, the two ends of the slit are illuminated with fluctuating light of different phases separated by a light separation image 60, it is evident that one end of each slit image 82 is composed of light of said one phase, the other end of each image is composed of light of said other phase, and the image is bisected by an image 60' of the light separation image 60. During relative movement of each slit image 82 and indexing slit 18 across one another at position 64, therefore, the relative position of the crossing slit image and slit illustrated in FIG. 3 is reached, wherein the light separation image 60' is centered with respect to the crossing slit 18. In this centered position of the light separation image 60', equal amounts of light of said one phase and said other phase pass through the aligned indexing slit. While the crossing slit image and slit are approaching this centered position, as illustrated in FIG. 2, a preponderance of light of one phase is transmitted through the crossing slit. Similarly, after the crossing slit image and slit have passed through and are receding from the centered position of FIG. 3, a preponderance of light of the other phase passes through the crossing slit.

It is evident, therefore, that during rotation of the shutter disc 12 with respect to the optical projection means 14, the shutter periodically moves through positions in which equal amounts of light of said one phase and said other phase are transmitted through an indexing slit 18 at position 64. These positions are the index positions of the shutter disc and their number and relative location with respect to the projection means 14 are determined by the number and location of the indexing slits 18 on the shutter disc. Obviously, while only a relatively few indexing slits 18 have been illustrated on the shutter disc 12, the number of indexing slits, and, therefore, the number of indexing positions of the shutter disc, may be made as large as permitted by the precision with which the indexing slits can be made and the resolution of the optics of the instrument. In a typical instrument, for example, each indexing slit would be on the order of .0005 inch wide and 0.1 inch long and would be spaced every degree one-half degree, or, in some instances, every four minutes. These slits can be placed on a coated glass disc with extreme accuracy by means of a ruling machine.

Located at the side of the shutter disc opposite to that on which the slit images 82 are produced, and on the axis 80 opposite position 64, is a photocell or other suitable photosensitive means. This photocell is disposed to receive the light passing through each indexing slit 18 as it is crossed by a slit image 82 at the position 64. The output of the photocell 84 is coupled to a phase-responsive amplifier 86. This amplifier actuates a meter 88. The circuitry of the amplifier 86 is such that when the photocell 84 receives equal amounts of light of said one phase and said other phase through an indexing slit 18, the meter 88 displays a zero reading. When the photocell 84 receives a preponderance of light of one phase, the meter 88 indicates a minus reading and when the photocell 84 receives a preponderance of light of the other phase, the meter 88 indicates a plus reading. This meter and control means 90 for the indexing motor 26 are placed at a control station 92 which may be located any desired distance from the main body of the indexing instrument.

In discussing the operation of the instrument, we will assume first that the optical tipping plate 72 is perpendicular to the optic axis 68 so that the tipping plate does not produce any deviation of the light rays transmitted through the plate. When the indexing motor 26 is energized from the control means 90 at the control station 92, to rotate the shutter disc 12 in one direction or the other, the shutter disc periodically rotates through its index positions in which the photocell 84 receives equal amounts of light of the two different phases, from lamps 54 and 56, through the indexing slit 18 currently undergoing relative movement across a slit image 82 at the position 64. When the shutter disc 12 is exactly centered in each of these indexing positions, then, the meter 88 indicates a zero reading. If the shutter disc 12 is slightly off center in one direction or the other from a particular index position, the meter 88 will indicate either a negative reading or a positive reading depending upon the direction of misalignment of the shutter disc with respect to the particular index position. Thus, the shutter disc 12 may be accurately rotated to any selected index position, from the remote control station 92, by controlling the indexing motor 26 to initially drive the shutter disc 12 approximately to the selected index position and then accurately locate the shutter disc in the desired index position.

In the illustrated instrument, of course, it is necessary to mentally note rotation of the shutter disc 12 through each of its index positions in order to arrive at a selected index position. My patent referred to earlier, however, discloses circuitry for electrically counting and displaying the index positions through which the shutter is driven. This circuitry may be employed in the present indexing instrument as well.

Coming now to the optical tipping plate 72, the latter turns on an axis 94 transverse to and so angularly oriented on the optic axis 68 as to produce deflection of the slit image 82 approximately along the row 16 of indexing slits 18 at the position 64 as the tipping plate runs on its axis 94. Thus, if the shutter disc 12 is brought to rest in a position between two index positions, the optical tipping plate 72 may be turned on its axis 94 to shift the slit image 82 along the row 16 to the centered position of FIG. 3. The angle through which the tipping plate must be turned to accomplish centering of the slit image on an adjacent index-slit 18 is related to the angular displacement of the shutter disc from the index position associated with the latter slit. If the optical tipping plate 72 is provided with a suitably calibrated scale 96, then, the position of the shutter disc 12 between two adjacent index positions may be interpolated and read directly from this scale.

It is obvious that while in the illustrative embodiment of the invention the shutter disc 12 is rotatable and the projection means 14 is stationary, the shutter disc may, as well, be retained stationary and the projection means rotated. In this case, of course, the indexing drive 20 would rotate the projection means, and its associated elements, rather than the shutter 12.

Clearly, then, the invention herein described and illustrated is fully capable of attaining the several objects and advantages preliminarily set forth.

While a presently preferred embodiment of the invention has been disclosed herein, numerous modifications in the design, arrangement of parts, and instrumentalities of the invention are possible within the spirit and scope of the following claims.

What is claimed is:

1. A rotary optical indexing fixture, comprising:
an opaque shutter plate;
a light transmitting and receiving system;
means for effecting relative rotation of said shutter plate and light system about an axis normal to the plate;
said shutter plate having a circular row of uniformly spaced transparent indexing slits, said row being centered on said axis and said slits extending transversely of and being approximately bisected by the longitudinal center line of the row;
the longitudinal center lines of said slits being tangent to a common circle of substantially smaller diameter than said row and centered on said axis, whereby said slits are inclined at the same angle to said row center line;
said light system including means at one side of said shutter plate opposite said row for illuminating said slits during relative movement of the latter past said illuminating means in such manner that one end of each slit is illuminated with fluctuating light of one phase and the other end of each slit is illuminated with fluctuating light of another phase, a photosensitive receiver at said one side of said shutter plate opposite said row and diametrically across the latter from said illuminating means, and means at the opposite side of said shutter plate for projecting optical images of the slits illuminated by said illuminating means onto said plate over said row and opposite said receiver in such manner that the slit images and slits undergo relative rotation across one another during relative rotation of said shutter plate and projection system, and the crossing slits and slit images are inclined at an acute angle to one another; and
means for sensing the phase of light incident on said receiver.

2. A rotary optical indexing fixture, comprising:
an opaque shutter plate;
a light transmitting and receiving system;
means for effecting relative rotation of said shutter plate and light system about an axis normal to the plate;
said shutter plate having a circular row of uniformly spaced transparent indexing slits, said row being centered on said axis and said slits extending transversely of and being approximately bisected by the longitudinal center line of the row;

the longitudinal center lines of said slits being tangent to a common circuit of substantially smaller diameter than said row and centered on said axis, whereby said slits are inclined at the same angle to said row center line;

said light system including means at one side of said shutter plate opposite said row for illuminating said slits during relative movement of the latter past said illuminating means in such manner that one end of each slit is illuminated with fluctuating light of one phase and the other end of each slit is illuminated with fluctuating light of another phase, a photosensitive receiver at said one side of said shutter plate opposite said row and diametrically across the latter from said illuminating means, means at the opposite side of said shutter plate for projecting optical images of the slits illuminated by said illuminating means onto said plate over said row and opposite said receiver in such manner that the slit images and slits undergo relative rotation across one another during relative rotation of said shutter plate and projection system, and the crossing slits and slit images are inclined at an acute angle to one another, and means for shifting said slit images along said row independently of relative rotation of said shutter plate and light system; and means for sensing the phase of light incident on said receiver.

3. A rotary optical indexing fixture, comprising:

an opaque shutter plate;

a light transmitting and receiving system;

means for effecting relative rotation of said shutter plate and light system about an axis normal to the plate;

said shutter plate having a circular row of uniformly spaced transparent indexing slits, said row being centered on said axis and said slits extending transversely of and being approximately bisected by the longitudinal center line of the row;

the longitudinal center lines of said slits being tangent to a common circle of substantially smaller diameter than said row and centered on said axis, whereby said slits are inclined at the same angle to said row center line;

said light system including means at one side of said shutter plate opposite said row for illuminating said slits during relative movement of the latter past said illuminating means in such manner that one end of each slit is illuminated with fluctuating light of one phase and the other end of each slit is illuminated with fluctuating light of another phase, a photosensitive receiver at said one side of said shutter plate opposite said row and diametrically across the latter from said illuminating means, means at the opposite side of said shutter plate for projecting optical images of the slits illuminated by said illuminating means onto said plate over said row and opposite said receiver in such manner that the slit images and slits undergo relative rotation across one another during relative rotation of said shutter plate and projection system, and the crossing slits and slit images are inclined at an acute angle to one another, and an optical tipping plate for shifting said slit images along said row independently of relative rotation of said shutter plate and light system, and means for sensing the phase of light incident on said receiver.

4. A rotary optical indexing fixture, comprising:

an opaque shutter plate;

a light transmitting and receiving system;

means for effecting relative rotation of said shutter plate and light system about an axis normal to the plate;

said shutter plate having a circular row of uniformly spaced transparent indexing slits, said row being centered on said axis and said slits extendng transversely of and being approximately bisected by the longitudinal center line of the row;

the longitudinal center lines of said slits being tangent to a common circle of substantaially smaller diameter than said row and centered on said axis, whereby said slits are inclined at the same angle to said row center line;

said light system including optical projection means at one side of said shutter plate and having an optic axis which intersects said row center line at diametrically opposite positions along said row and extends normal to said plate at each position, means along said optic axis at the opposite side of said shutter plate and opposite one of said positions for directing rays of fluctuating light of one phase toward said row at one side of an optic plane parallel to said optic axis and approximately tangent too said row center line, and directing rays of fluctuating light of another phase toward said row at the opposite side of said optic plane, whereby the ends of said slits are illuminated by fluctuating light of different phase as the slits undergo relative movement past said illuminating means, a photosensitive receiver along said optic axis at said opposite side of the shutter plate and opposite the other position, and said projection means projecting an optical image of the slits illuminated by said illuminating means onto said shutter plate opposite said receiver in such manner that the slit images and slits undergo relative movement across one another during relative rotation of said shutter plate and light system, and the crossing slits and slit images are inclined at an acute angle to one another; and means for sensing the phase of light incident on said receiver.

5. A rotary optical indexing fixture, comprising:

an opaque shutter plate;

a light transmitting and receiving system;

means for effecting relative rotation of said shutter plate and light system about an axis normal to the plate;

said shutter plate having a circular row of uniformly spaced transparent indexing slits, said row being centered on said axis and said slits extending transversely of and being approximately bisected by the longitudinal center line of the row;

the longitudinal center lines of said slits being tangent to a common circle of substantially smaller diameter than said row and centered on said axis, whereby said slits are inclined at the same angle to said row center line;

said light system including optical projection means at one side of said shutter plate having an optic axis which intersects said row center line at diametrically opposite positions along said row and extends normal to said plate at each position, means along said optic axis at the opposite side of said shutter plate and opposite one of said positions for directing rays of fluctuating light of one phase toward said row at one side of an optic plane parallel to said optic axis and approximately tangent to said row center line, and directing rays of fluctuating light of another phase toward said row at the opposite side of said optic plane, whereby the ends of said slits are illuminated by fluctuating light of different phase as the slits undergo relative movement past said illuminating means, a photosensitive receiver along said optic axis at said opposite side of the shutter plate and opposite the other position, said projection means projecting an optical image of the slits illuminated by said illuminating means onto said shutter plate opposite said receiver in such manner that the slit images and slits undergo relative movement across one another during relative rotation of said shutter plate and light system, and the crossing slits and slit images are inclined at an acute angle to one another, and means along said optic axis for shifting said slit images along said row independently of relative rotation of said shutter plate and light system; and means for sensing the phase of light incident on said receiver.

6. A rotary optical indexing fixture, comprising:

an opaque shutter plate;

a light transmitting and receiving system;

means for effecting relative rotation of said shutter plate and light system about an axis normal to tthe plate;

said shutter plate having a circular row of uniformly spaced transparent indexing slits, said row being centered on said axis and said slits extending transversely of and being approximately bisected by the longitudinal center line of the row;

the longitudinal center lines of said slits being tangent to a common circle of substantially smaller diameter than said row and centered on said axis, whereby said slits are inclined at the same angle to said row center line;

said light system including optical projection means at one side of said shutter plate and having an optic axis which intersects said row center line at diametrically opposite positions along said row and extends normal to said plate at each position, means along said optic axis at the opposite side of said shutter plate and opposite one of said positions for directing rays of fluctuating light of one phase toward said row at one side of an optic plane parallel to said optic axis and approximately tangent to said row center line, and directing rays of fluctuating light of another phase toward said row at the opposite side of said optic plane, whereby the ends of said slits are illuminated by fluctuating light of different phase as the slits undergo relative movement past said illuminating means, a photosensitive receiver along said optic axis at said opposite side of the shutter plate and opposite the other position, said projection means projecting an optical image of the slits illuminated by said illuminating means onto said shutter plate opposite said receiver in such manner that the slit images and slits undergo relative movement across one another during relative rotation of said shutter plate and light system, and the crossing slits and slit images are inclined at an acute angle to one another, and an optical tipping plate along said optic axis for shifting said slit images along said row independently of relative rotation of said shutter plate and light system; and means for sensing the phase of light incident on said receiver.

References Cited by the Examiner
UNITED STATES PATENTS

| | | | |
|---|---|---|---|
| 2,937,283 | 5/1960 | Oliver | 250—233 |
| 3,024,365 | 3/1962 | Smith et al. | 250—233 X |
| 3,054,901 | 9/1962 | Davidson | 250—233 |
| 3,219,830 | 11/1965 | Sharman et al. | 250—237 |

RALPH G. NILSON, *Primary Examiner.*

WALTER STOLWEIN, *Examiner.*

J. D. WALL, *Assistant Examiner.*